US011113002B2

(12) United States Patent
Spencer

(10) Patent No.: US 11,113,002 B2
(45) Date of Patent: Sep. 7, 2021

(54) COMMAND OVERLAP CHECKING IN A DATA STORAGE DEVICE

(71) Applicant: Seagate Technology LLC, Cupertino, CA (US)

(72) Inventor: Thomas V. Spencer, Fort Collins, CO (US)

(73) Assignee: Seagate Technology LLC, Fremont, CA (US)

(*) Notice: Subject to any disclaimer, the term of this patent is extended or adjusted under 35 U.S.C. 154(b) by 17 days.

(21) Appl. No.: 16/663,518

(22) Filed: Oct. 25, 2019

(65) Prior Publication Data

US 2021/0124525 A1 Apr. 29, 2021

(51) Int. Cl.
*G06F 3/06* (2006.01)
*G06F 12/1009* (2016.01)
*G06F 12/109* (2016.01)

(52) U.S. Cl.
CPC .......... *G06F 3/0659* (2013.01); *G06F 3/0619* (2013.01); *G06F 3/0673* (2013.01); *G06F 12/109* (2013.01); *G06F 12/1009* (2013.01); *G06F 2212/1032* (2013.01)

(58) Field of Classification Search
CPC .... G06F 3/0619; G06F 3/0659; G06F 3/0673; G06F 12/109; G06F 12/1009
See application file for complete search history.

(56) References Cited

U.S. PATENT DOCUMENTS

| 6,490,635 | B1 | 12/2002 | Holmes |
| 8,321,639 | B2 | 11/2012 | Lund et al. |
| 8,452,912 | B2 | 5/2013 | Lee et al. |
| 9,552,289 | B1 | 1/2017 | Spencer |
| 9,916,089 | B2 | 3/2018 | Palmer |
| 9,946,462 | B1 | 4/2018 | Li et al. |
| 2014/0006682 | A1* | 1/2014 | Nanditale ........... G06F 12/1441 711/102 |
| 2014/0013026 | A1* | 1/2014 | Jannyavula Venkata ..... G06F 12/0246 711/103 |
| 2018/0314421 | A1 | 11/2018 | Linkovsky et al. |
| 2018/0357170 | A1 | 12/2018 | Benisty |
| 2019/0035473 | A1* | 1/2019 | Rajamani ............ G06F 3/061 |
| 2020/0066341 | A1* | 2/2020 | McGlaughlin ...... G06F 3/0619 |

* cited by examiner

*Primary Examiner* — Reginald G Bragdon
*Assistant Examiner* — Curtis James Kortman
(74) *Attorney, Agent, or Firm* — Westman, Champlin & Koehler, P.A.

(57) ABSTRACT

A data storage device includes a controller configured to recognize commands received from a host as single logical address (LA) commands or multi-LA commands. The data storage drive also includes a command overlap detection table having a plurality of records with each record configured to store multiple unrelated LAs associated with different single LA commands and configured to store multiple related LAs associated with a single multi-LA command.

20 Claims, 3 Drawing Sheets

COMMAND OVERLAP CHECKING IN A DATA STORAGE DEVICE

SUMMARY

In one embodiment, a data storage device includes a controller configured to recognize commands received from a host as single logical address (LA) commands or multi-LA commands. The data storage device also includes a command overlap detection table having a plurality of records with each record configured to store multiple unrelated LAs associated with different single LA commands and configured to store multiple related LAs associated with a single multi-LA command.

In another embodiment, a method includes recognizing commands received in a data storage drive from a host as single LA commands or multi-LA commands. The method also includes storing multiple LAs associated with different commands in a same record of a command overlap detection table when the different commands are recognized as single LA commands. The method further includes storing multiple LAs associated with a same command in the same record of the command overlap detection table when the same command is recognized as a multi-LA command.

In yet another embodiment, an apparatus includes at least one non-volatile storage medium configured to store user data received via a host. The apparatus also includes a controller that is communicatively coupled to the at least one non-volatile storage medium. The controller is configured to recognize commands related to the user data received from the host as single LA commands or multi-LA commands. The apparatus further includes a command overlap detection table having a plurality of records with each record configured to store multiple unrelated LAs associated with different single LA commands and configured to store multiple related LAs associated with a single multi-LA command.

This summary is not intended to describe each disclosed embodiment or every implementation of command overlap checking in a data storage device as described herein. Many other novel advantages, features, and relationships will become apparent as this description proceeds. The figures and the description that follow more particularly exemplify illustrative embodiments.

DETAILED DESCRIPTION OF ILLUSTRATIVE EMBODIMENTS

Figure 1:
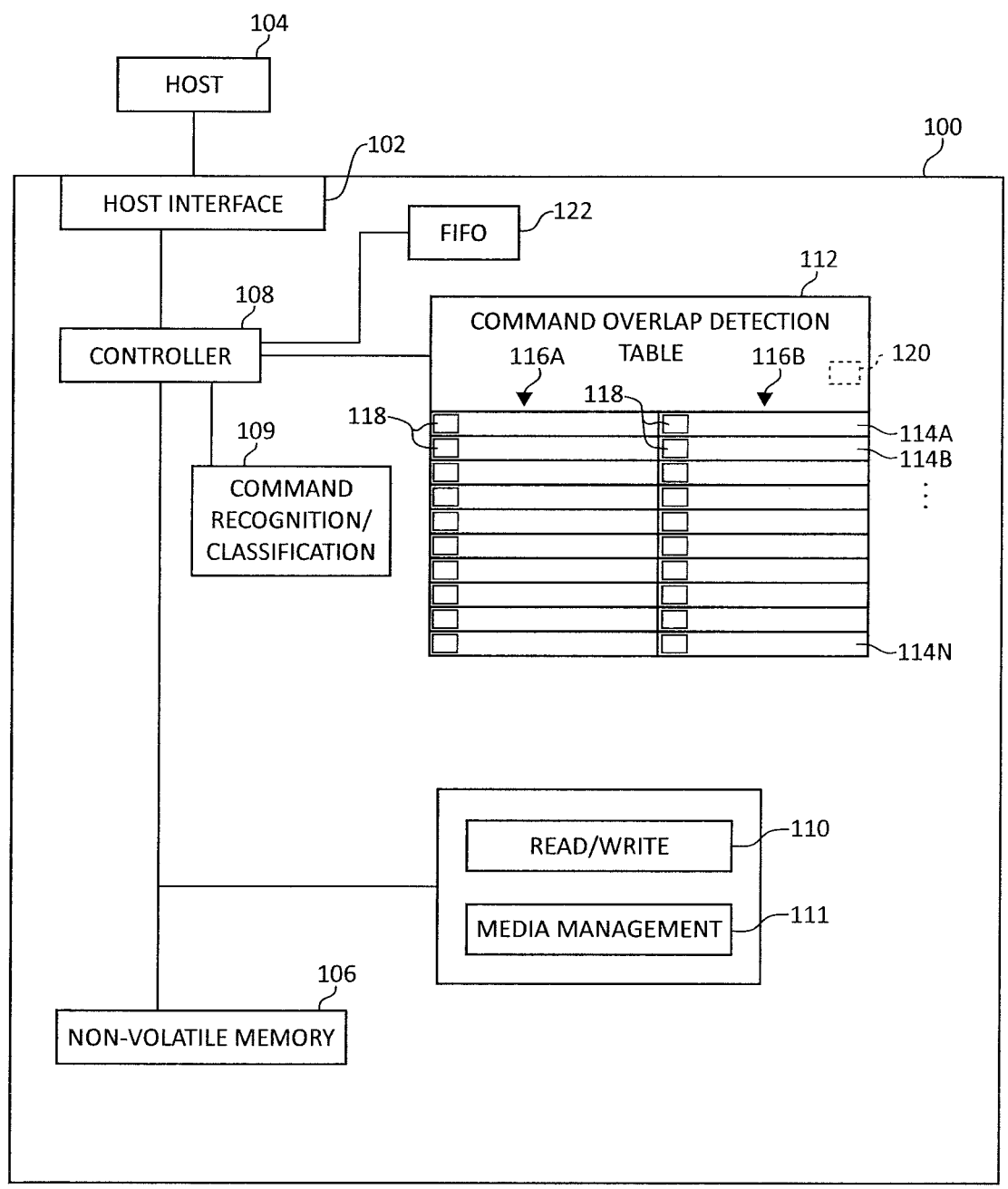
FIG. 1 is a block diagram that illustrates a data storage device according to an example embodiment.

Data storage drives (e.g., solid-state drives (SSDs) and hard disc drives (HDDs)) perform command overlap checking to avoid corrupted data when a common set of data is being simultaneously written and read by different commands. Embodiments of the disclosure provide an efficient method for command overlap checking and an increase in the effective queue depth/table size for overlap checking. In embodiments of the disclosure, information for multiple small-size commands (e.g., commands associated with a single logical address (LA)) may be stored in a same record of a command overlap detection table, which, in prior implementations, would only store information for a single command independently of command size. This allows for a compact command overlap detection table, which saves cost and increases command overlap checking efficiency.

Data storage drives such as HDDs and SSDs utilize a host interface that facilitates communications between a host (e.g., central processing unit) and an embedded processor within the data storage drive. The communications may utilize a standard such as Serial Advanced Technology Attachment (SATA), Small Computer System Interface (SCSI), Serial Attached SCSI (SaS), Peripheral Component Interconnect (PCI), etc. The host uses logical block addresses (LBAs) to access (e.g., read from and write to) the data storage drive, and the storage drive may maintain its own system of logical and physical addresses that are mapped to associated host logical addresses. A HDD may use relatively straightforward mapping, which involves directly mapping LBAs to physical addresses. However, SSDs may employ mapping units (MUs) in addition to LBAs and physical addresses. Each MU typically includes a predetermined number of contiguous/sequential LBAs (e.g., 8 LBAs) grouped together to allow for tracking of MUs (instead of individual LBAs), because tracking of all LBAs may be prohibitively expensive. MUs are identified by map unit addresses (MUAs), which may be derived from LBAs.

HDDs generally carry out command overlap checking under firmware (FW) control with some hardware (HW) assistance. For performance reasons, in certain SSD embodiments, command overlap checking may be carried out in HW without FW involvement. Also, for performance reasons, the queue depth should typically be substantially deep (e.g., 512 entries/records) to sustain full performance. The full queue depth may primarily be utilized when the commands are very small (e.g., 1 MU). A command associated with a single MU includes only a single MUA, while commands associated with multiple MUs include multiple MUAs (e.g., a starting or lower MUA and an ending or upper MUA to identify the range of MUs for the operation). This disclosure improves prior implementations to take advantage of the fact that extreme depth is utilized primarily for 1 MU operations. A large number of 1 MU operations are typical when there is random read traffic, which involves reading different small chunks of data form a large number of different locations.

In one current implementation, each entry in the queue stores the lower and upper MUAs plus a valid bit, which may amount to a total of 87 bits per queue entry. For a 512 entry queue, such an implementation uses approximately 45000 flip-flops plus associated comparators and control logic. As will be described in detail further below, an embodiment of the disclosure allows the logic to store two 1 MU extents in the space that normally would only store a single MU if the MU was greater than 1 MU. Thus, a design that is approximately the size of a 256 entry queue can now store 512 entries provided that most of the entries are single MU extents. Effectively such an embodiment allows the queue depth to double for the performance case with minimal growth. Details regarding the different embodiments are provided below in connection with FIGS. 1A-3B.

It should be noted that the same reference numerals are used in different figures for same or similar elements. It should also be understood that the terminology used herein is for the purpose of describing embodiments, and the terminology is not intended to be limiting. Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that, unless indicated otherwise, any labels such as "left," "right," "front," "back," "top," "bottom," "forward," "reverse," "clockwise," "counter clockwise," "up," "down," or other similar terms such as "upper," "lower," "aft," "fore," "vertical," "horizontal," "proximal," "distal," "intermediate" and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

It will be understood that when an element is referred to as being "connected," "coupled," or "attached" to another element, it can be directly connected, coupled or attached to the other element, or it can be indirectly connected, coupled, or attached to the other element where intervening or intermediate elements may be present. In contrast, if an element is referred to as being "directly connected," "directly coupled" or "directly attached" to another element, there are no intervening elements present. Drawings illustrating direct connections, couplings or attachments between elements also include embodiments, in which the elements are indirectly connected, coupled or attached to each other.

FIG. 1 is a block diagram that illustrates a data storage device 100 according to an example embodiment. The data storage device 100 may be any type of persistent storage device, including a solid-state drive (SSD), thumb drive, memory card, embedded device storage, hybrid drive, etc. The data storage device 100 may include a host interface 102 that facilitates communications between the data storage device 100 and a host 104, e.g., a computer. The data storage device 100 also includes data storage media, here shown as solid-state, non-volatile memory 106. The host 104 can store user data on and read user data from the memory 106 via the host interface 102. One or more controllers 108 internally manage these storage operations.

The controller 108 may include general-purpose or special-purpose processors that perform operations of the apparatus. The controller 108 may include any combination of microprocessors, digital signal processor (DSPs), application specific integrated circuits (ASICs), field programmable gate arrays (FPGAs), or other equivalent integrated or discrete logic circuitry suitable for performing the various functions described herein. Functions that may be provided by, or with the help of, the controller 108 include host command recognition/classification, read/write operations, and media management, which are represented here by functional modules 109, 110, 111. The modules 109, 110, 111 may be implemented using any combination of hardware apparatus, software, and firmware, and may separately or cooperatively perform different data storage management operations.

The recognition/classification module 109 in one embodiment recognizes received host requests/commands as single LA commands or multi-LA commands for managing storage of the commands in a command overlap detection table 112, which is described further below. It should be noted that an LA may be a single LBA or an MUA associated with a predetermined number of contiguous LBAs. The read/write module 110 manages host requests to read and write data, and this may involve logical to physical addresses translation, etc. The media management module 111 may perform internally-initiated (e.g., background) tasks such as garbage collections and wear leveling.

Command overlap detection table 112 is utilized to perform command overlap checking to prevent read/write module 110 from, for example, simultaneously reading from and writing to a common set of data when executing different commands. As can be seen in FIG. 1, command overlap detection table 112 includes multiple records 114A-114N with each record capable of storing multiple unrelated LAs associated with different single LA commands, and also capable of storing multiple related LAs associated with a single multi-LA command. As noted above, controller 108 recognizes whether commands received from host 104 are single LA commands or multi-LA commands with the help of command recognition/classification module 109. When controller 108 recognizes different received commands (e.g., two different received commands) as single LA commands, controller 108 stores the LAs associated with the different commands in a same record of command overlap detection table 112. For example, controller 108 may store a first LA associated with a first single LA command in portion 116A of record 114A and may store a second LA associated with a second single LA command in portion 116B of record 114A. Further, when controller 108 recognizes a single command as a multi-LA command, controller 108 stores multiple LAs (e.g., a starting LA and an ending LA) associated with the single command in the same record of the command overlap detection table 112. For example, controller 108 may store the starting LA of a multi-LA command in portion 116A of record 114B and may store the ending LA of the multi-LA command in portion 116B of record 114B. Additionally, in the command overlap detection table 112, the LAs associated with the different commands may be identified differently from the multiple LAs associated with the same command. For example, controller 108 may store first identifiers (e.g., bits set to 0) in locations 118 of record 114A for the multiple LAs associated with the different single LA commands stored in record 114A. Similarly, controller 108 may store second identifiers (e.g., bits set to 1) in locations 118 of record 114B for the starting and ending LAs associated with the multi-LA command stored in record 114B. It should be noted that validity bits may be employed to indicate whether portions 116A and/or 116B include valid information (e.g., LA information as opposed to no information).

Command overlap detection table 112 may be implemented using at least one of hardware, software, or firmware. When command overlap detection table 112 is implemented with hardware, table 112 may include compare logic 120 for command overlap detection. As indicated above, a new command received in data storage device 100 includes at least one LA. The compare logic 120 compares the at least one LA of the new command with individual ones of multiple LAs associated with different single LA commands that may be stored in the command overlap detection table 112. Compare logic 120 also determines whether the at least one LA of the new command is within a range defined by a starting LA and an ending LA of any multi-LA commands that may be stored in the command overlap detection table 112. If the compare logic 120 determines that the new command does not overlap with any of the commands stored in the command overlap detection table 112, the new command is stored in table 112 and is also executed by controller 108 with the help of read/write module 110. If compare logic 120 detects that there is an overlap between the new command and any previously stored command(s) in the command overlap detection table 112, the new command is stored in table 112 and also written into a first in, first out (FIFO) file 122 for subsequent command overlap checking and execution. Such commands in the FIFO file 122 are referred to herein as blocked commands. Thus, blocked commands are stored in both FIFO file 122 and in command overlap detection table 112, and currently-executing commands (which are not blocked due to any overlap) are stored in command overlap detection table 112 and not stored in FIFO file 122. An identifier may be utilized in command overlap detection table 112 to distinguish between blocked commands and currently-executing commands.

It should be noted that, when execution of any currently-executing command stored in the command overlap detection table 112 is completed, that command is removed/deleted from table 112. Upon deletion of a command from the command overlap detection table 112, compare logic 120 determines whether LAs of each blocked command in the FIFO file 122 overlap with LAs of commands stored in the command overlap detection table 112. Compare logic 120 performs this operation because deletion of a command from the command overlap detection table 112 may eliminate an overlap condition with one or more commands in the FIFO file 122. It should be noted that, when blocked commands in the FIFO file 122 are checked for overlap with the commands in the command overlap detection table 112, they are treated like new commands for purposes of command overlap checking. Thus, the blocked commands are deleted from the command overlap detection table 112 just before command overlap checking for the blocked commands is carried out. Then, during the checking, if any blocked command is found to overlap with one of more commands in the table 112, that command is stored in table 112 and again recycled through FIFO file 122 for subsequent command overlap checking and execution. If no overlap is detected, the command is stored in command overlap detection table 112 and not recycled through the FIFO file 122. In some embodiments, both FIFO file 122 and command overlap detection table 112 may have a same depth. One embodiment of a command overlap detection table with compare logic is described below in connection with FIG. 2.

Figure 2:
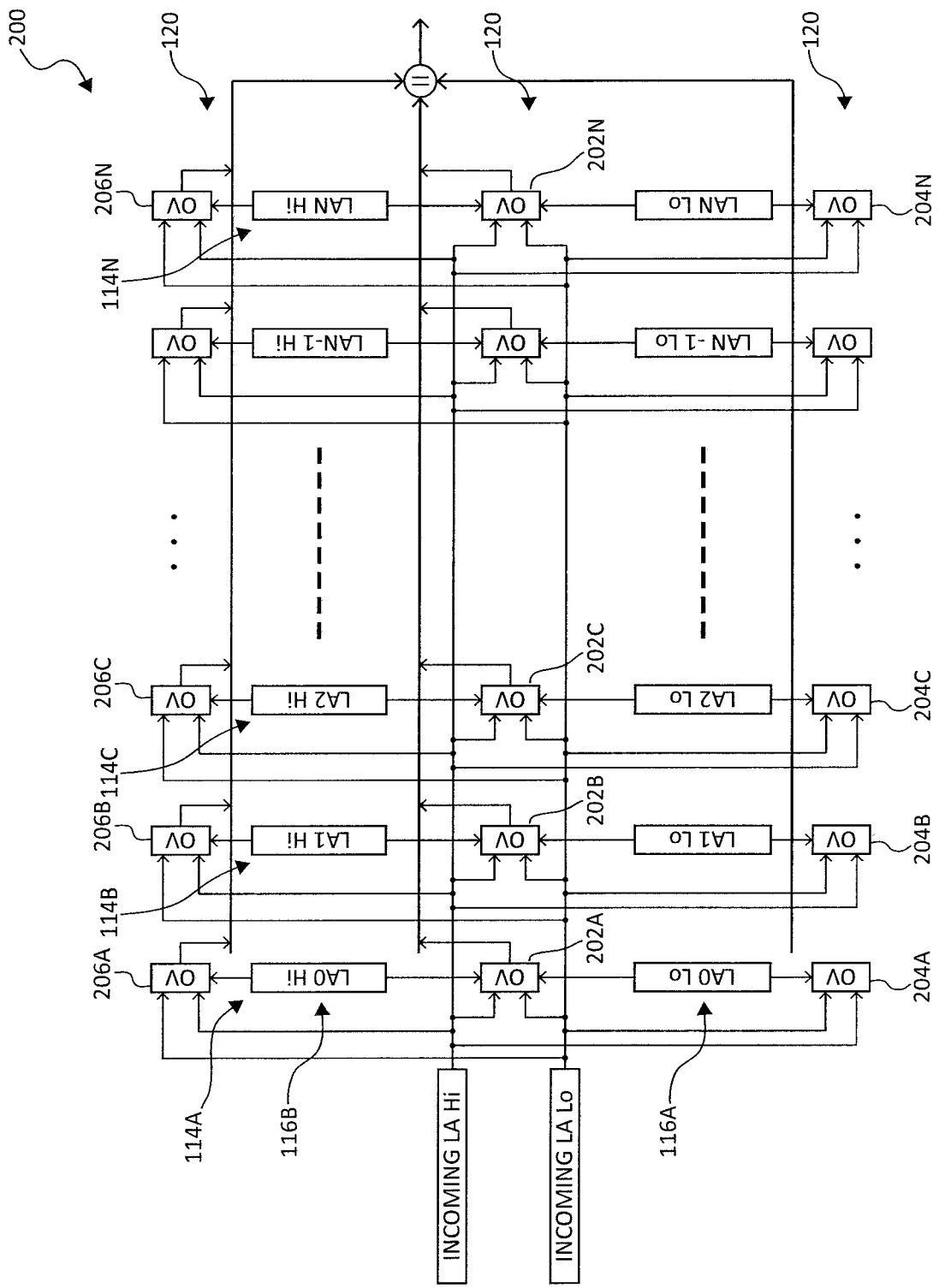
FIG. 2 is a diagrammatic illustration of a command overlap detection table with compare logic in accordance with one embodiment.

FIG. 2 is a diagrammatic illustration of a command overlap detection table 200 with compare logic in accordance with one embodiment. As in the case of command overlap detection table 112 of FIG. 1, table 200 includes multiple records 114A-114N with each record capable of storing multiple unrelated LAs associated with different single LA commands, and also capable of storing multiple related LAs associated with a single multi-LA command. As indicated above, each of record 114 has multiple portions (e.g., portions 116A and 116B). As noted above, portions 116A and 116B of each record 114 may store LAs associated with different single LA commands or store a starting LA (e.g., a low LA) and an ending LA (e.g., a high LA) of a same multi-LA command. In table 200, compare logic 120 includes a first plurality of overlap detection blocks 202A-202N having circuitry that is configured to compare LAs of a new multi-LA command (e.g., an incoming low LA and an incoming high LA) with low and high LAs of multi-LA commands that may be stored in each of records 114A-114N. In one embodiment, to check whether there is overlap, each of the overlap detection blocks 202A-202N determines whether the incoming high LA is lower than the low LA stored in portion 116A, and also determines whether the incoming low LA is higher than the high LA in portion 116B. Further examples of such comparisons are provided below. Compare logic 120 also includes a second plurality of overlap detection blocks 204A-204N that compare the incoming low LA and the incoming high LA with an LA of a single LA command that may be stored in portion 116A of any of records 114A-114N. Compare logic 120 further includes a third plurality of overlap detection blocks 206A-206N that compare the incoming low LA and the incoming high LA with an LA of a single LA command that may be stored in portion 116B of any of records 114A-114N. It should be noted that, in the embodiment of FIG. 2, a new single LA command may be treated as a multi-LA command having a same low and high LA. Operation of compare logic 120 is described below using a simple example in which a logical space has 50 LAs (LA0-LA49).

Consider that a first LA (LA15) associated with a first single LA command is stored in portion 116A of record 114A and a second LA (LA20) associated with a second single LA command is stored in portion 116B of record 114A. Further, a low LA (LA30) of a multi-LA command is stored in portion 116A of record 114B and a high LA (LA40) of the multi-LA command in portion 116B of record 114B. The remaining records 114C-114N are invalid (e.g., include no stored LAs). If, for a first new command, the incoming low LA is LA16 and the incoming high LA is LA19, then command logic 102 will detect no overlap. Specifically, when incoming low LA16 and incoming high LA19 are compared to LA15 (from portion 116A of record 114A) in overlap detection block 204A, no LA overlap is detected. Similarly, when incoming low LA16 and incoming high LA19 are compared to LA20 (from portion 116B of record 114A) in overlap detection block 206A, no LA match is detected. Further, when overlap detection block 202B compares incoming high LA19 with low LA (LA30) (of the multi-LA command stored in portion 116A of record 114B) will determine that incoming high LA19 is lower than stored low LA30, and therefore there is no overlap.

If, for a second new command, the incoming low LA is LA35 and the incoming high LA is LA49, then compare logic 120 will detect an overlap. Here, overlap detection blocks 204A and 206A carry out comparisons of incoming and stored LAs in a manner described above, and find no overlap. However, when overlap detection block 202B determines that incoming low LA35 in not greater than high LA40 stored in portion 116B of record 114B, an overlap is detected.

Figure 3A:
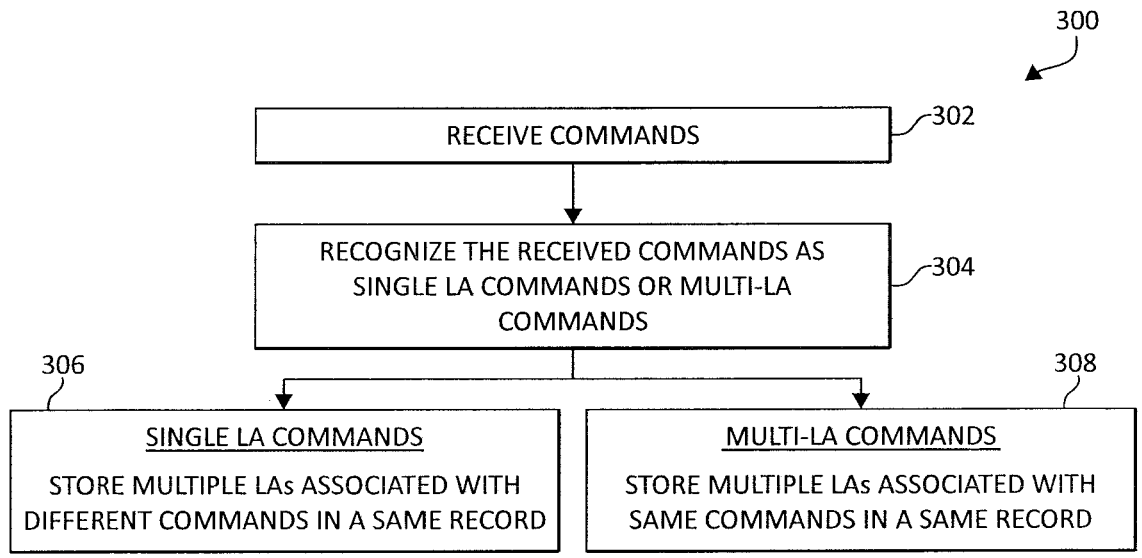
FIGS. 3A and 3B are flow diagrams of method embodiments.

FIG. 3A is a flowchart of a method 300 in accordance with one embodiment. At 302, commands are received in a data storage device (e.g., 100 of FIG. 1) from a host (e.g., 104 of FIG. 1). At 304, the commands are recognized in the data storage device as single LA commands or multi-LA commands. At 306, multiple LAs associated with different commands are stored in a same record of a command overlap detection table when the different commands are recognized as single LA commands. At 308, multiple LAs associated with a same command are stored in the same record of the command overlap detection table when the same command is recognized as a multi-LA command.

Figure 3B:
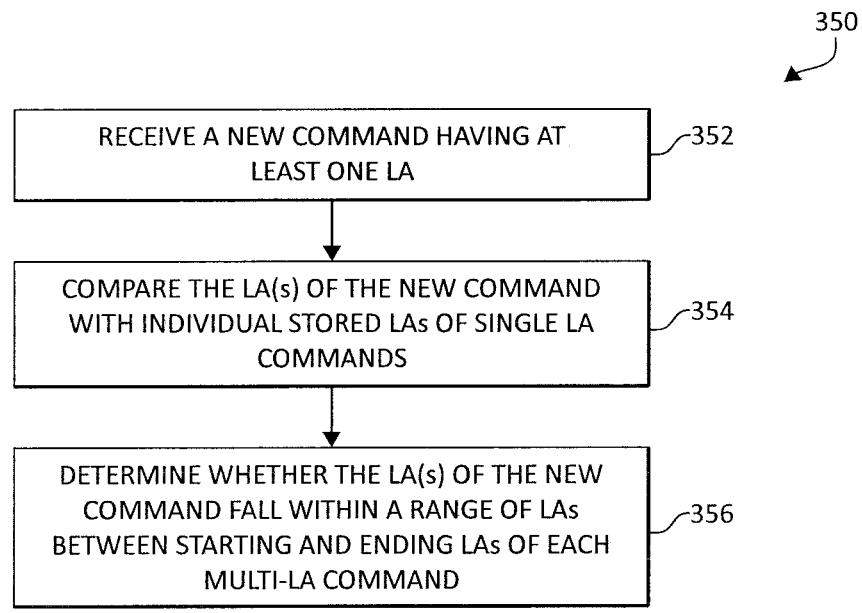

FIG. 3B is a flowchart of a method 350 in accordance with one embodiment. At 352, a new command having at least one LA is received in a data storage drive (e.g., 100 of FIG. 1). At 354, LA(s) of the new command are compared with individual stored LAs of single LA commands. Also, at 356, a determination is made as to whether the LA(s) of the new command fall within a range of LAs between starting and ending LAs of each multi-LA command.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments employ more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A data storage device comprising:
   a controller configured to recognize commands received from a host as single logical address (LA) commands or multi-LA commands; and
   a command overlap detection table having a plurality of records with each record having a predetermined bit length and configured to:
      store multiple unrelated LAs associated with different single LA commands;
      store multiple related LAs associated with a single multi-LA command; and
      the record is not configured to store the unrelated LAs associated with the different single LA commands together with the multiple related LAs associated with the single multi-LA command at the same time.

2. The data storage device of claim 1 and wherein the command overlap detection table is further configured to store first identifiers for the multiple unrelated LAs associated with different single LA commands and configured to store second identifiers for the multiple related LAs associated with the single multi-LA command.

3. The data storage device of claim 1 and wherein each LA of the multiple unrelated LAs associated with different single LA commands and the multiple related LAs associated with the corresponding single multi-LA command corresponds to a single logical block address (LBA).

4. The data storage device of claim 1 and wherein each LA of the multiple unrelated LAs associated with different single LA commands and the multiple related LAs associated with the single multi-LA command is a corresponding mapping unit address (MUA) associated with a predetermined number of contiguous logical block address (LBAs).

5. The data storage device of claim 1 and wherein the command overlap detection table comprises a hardware table having hardware records, with each hardware record configured to store the multiple unrelated LAs associated with the different single LA commands, and configured to store the multiple related LAs associated with the single multi-LA command.

6. The data storage device of claim 5 and wherein the hardware table further comprises compare logic for command overlap detection.

7. The data storage device of claim 1 and wherein the command overlap detection table is defined by firmware.

8. A method comprising:
   recognizing commands received in a data storage drive from a host as single logical address (LA) commands or multi-LA commands;
   providing a command overlap detection table having a plurality of records with each record having a predetermined bit length;
   storing multiple LAs associated with different commands in a same record of the command overlap detection table when the different commands are recognized as single LA commands;
   storing multiple LAs associated with a same command in the same record of the command overlap detection table when the same command is recognized as a multi-LA command; and
   not storing in the same record of the command overlap detection table the multiple LAs associated with the different single LA commands together with the multiple LAs associated with the same multi-LA command at the same time.

9. The method of claim 8 and further comprising:
   storing first identifiers for the multiple LAs associated with the different commands in the command overlap detection table; and
   storing second identifiers for the multiple LAs associated with the same command in the command overlap detection table.

10. The method of claim 8 and wherein the multiple LAs associated with the same command comprise a starting LA and an ending LA that together identify a range of LAs associated with the same command.

11. The method of claim 10 and further comprising:
   receiving a new command in the data storage drive, the new command comprising at least one LA;
   comparing the at least one LA of the new command with individual ones of the multiple LAs associated with the different commands when the multiple LAs associated with different commands are stored in the command overlap detection table; and determining whether the at least one LA of the new command is within the range of LAs of the same command when the starting LA and the ending LA of the same command are stored in the command overlap detection table.

12. The method of claim 8 and wherein each LA of the multiple LAs associated with different single LA commands and the multiple LAs associated with the same multi-LA command corresponds to a corresponding single logical block address (LBA).

13. The method of claim 8 and wherein each LA of the multiple LAs associated with different single LA commands and the multiple LAs associated with the same multi-LA command is a corresponding mapping unit address (MUA) associated with a predetermined number of contiguous logical block address (LBAs).

14. The method of claim 8 and further comprising providing the command overlap detection table as a hardware-logic table.

15. The method of claim 8 and further comprising providing the command overlap detection table as a firmware-defined table.

16. An apparatus comprising:
at least one non-volatile storage medium configured to store user data received via a host;
a controller, communicatively coupled to the at least one non-volatile storage medium, the controller configured to recognize commands related to the user data received from the host as single logical address (LA) commands or multi-LA commands; and
a command overlap detection table having a plurality of records with each record having a predetermined bit length and configured to:
store multiple unrelated LAs associated with different single LA commands;
store multiple related LAs associated with a single multi-LA command; and
the record is not configured to store the unrelated LAs associated with the different single LA commands together with the multiple related LAs associated with the single multi-LA command at the same time.

17. The apparatus of claim 16 and wherein the command overlap detection table is further configured to store first identifiers for the multiple unrelated LAs associated with different single LA commands and configured to store second identifiers for the multiple related LAs associated with the single multi-LA command.

18. The apparatus of claim 16 and wherein each LA of the multiple unrelated LAs associated with different single LA commands and the multiple related LAs associated with the corresponding single multi-LA command corresponds to a single logical block address (LBA).

19. The apparatus of claim 16 and wherein each LA of the multiple unrelated LAs associated with different single LA commands and the multiple related LAs associated with the single multi-LA command is a corresponding mapping unit address (MUA) associated with a predetermined number of contiguous logical block address (LBAs).

20. The apparatus of claim 16 and wherein the command overlap detection table comprises a hardware table having hardware records, with each hardware record configured to store the multiple unrelated LAs associated with the different single LA commands and configured to store the multiple related LAs associated with the single multi-LA command.

* * * * *